United States Patent
Xie

(10) Patent No.: US 11,721,057 B2
(45) Date of Patent: Aug. 8, 2023

(54) SELECTIVELY TURNING OFF ANIMATION FEATURES TO ADDRESS FRAME RATE INADEQUACY

(71) Applicant: Tencent Technology (Shenzhen) Company Limited, Guangdong (CN)

(72) Inventor: Wei Xie, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 17/859,760

(22) Filed: Jul. 7, 2022

(65) Prior Publication Data

US 2022/0343577 A1 Oct. 27, 2022

Related U.S. Application Data

(63) Continuation of application No. 17/159,285, filed on Jan. 27, 2021, now Pat. No. 11,450,052, which is a
(Continued)

(30) Foreign Application Priority Data

Jul. 19, 2017 (CN) .......................... 201710588981.X

(51) Int. Cl.
*G06T 13/40* (2011.01)
*A63F 13/50* (2014.01)
*G06T 1/20* (2006.01)

(52) U.S. Cl.
CPC .............. *G06T 13/40* (2013.01); *A63F 13/50* (2014.09); *G06T 1/20* (2013.01)

(58) Field of Classification Search
CPC ........... G06T 13/40; G06T 13/00; G06T 1/20; G06T 2210/08; A63F 13/50; A63F 13/52; A63F 13/56; A63F 13/77
See application file for complete search history.

(56) References Cited

U.S. PATENT DOCUMENTS

| 8,633,932 B1 | 1/2014 | Pighin et al. |
| 9,466,127 B2 | 10/2016 | Lindahl et al. |

(Continued)

FOREIGN PATENT DOCUMENTS

| CN | 1776746 A | 5/2006 |
| CN | 104811821 A | 7/2015 |

(Continued)

OTHER PUBLICATIONS

International Search Report dated Oct. 11, 2018 in PCT/CN2018/096268 filed Jul. 19, 2018 (w/English translation).
(Continued)

*Primary Examiner* — Xilin Guo
(74) *Attorney, Agent, or Firm* — ArentFox Schiff LLP

(57) ABSTRACT

A terminal device for playing a game includes a display screen for displaying animation of the game, and processing circuitry. The processing circuitry detects a frame rate inadequacy of animation frames that are generated according to animation features respectively associated with animation files. Then, the processing circuitry obtains preconfigured values respectively associated with the animation files. A preconfigured value associated with an animation file is indicative of performance influence for turning off an animation feature associated with the animation file. Further, the processing circuitry turns off one or more animation features according to the preconfigured values associated with the animation files until an adequate frame rate is achieved.

20 Claims, 10 Drawing Sheets

Related U.S. Application Data continuation of application No. 16/541,991, filed on Aug. 15, 2019, now Pat. No. 10,970,908, which is a continuation of application No. PCT/CN2018/096268, filed on Jul. 19, 2018.

(56) References Cited

U.S. PATENT DOCUMENTS

| | | | | |
|---|---|---|---|---|
| 10,498,860 | B2* | 12/2019 | Howell | A63F 13/30 |
| 2006/0046819 | A1 | 3/2006 | Nguyen et al. | |
| 2007/0233759 | A1 | 10/2007 | Tomlinson et al. | |
| 2011/0096077 | A1* | 4/2011 | Jarrett | G06T 13/00 345/473 |
| 2011/0289458 | A1* | 11/2011 | Yu | H04N 21/4312 715/810 |
| 2012/0081382 | A1 | 4/2012 | Lindahl et al. | |
| 2015/0177822 | A1 | 6/2015 | Shoshan | |
| 2018/0181999 | A1* | 6/2018 | Kim | G06Q 30/02 |
| 2019/0317595 | A1* | 10/2019 | Nakata | G06F 3/012 |

FOREIGN PATENT DOCUMENTS

| | | |
|---|---|---|
| CN | 105025382 A | 11/2015 |
| CN | 105117191 A | 12/2015 |
| CN | 105719229 A | 6/2016 |
| CN | 106775811 A | 5/2017 |
| CN | 106919401 A | 7/2017 |
| CN | 106933327 A | 7/2017 |
| CN | 107398070 A | 11/2017 |
| WO | 2015172725 A1 | 11/2015 |

OTHER PUBLICATIONS

Written Opinion dated Oct. 11, 2018 in PCT/CN2018/096268 filed Jul. 19, 2018.
Office Action dated Mar. 7, 2018 in Chinese Patent Application No. 201710588981.X (w/concise English translation).

* cited by examiner

| Animation script name | Graphics drawing interface calling times (Draw call times) | Influence value |
|---|---|---|
| boomAction.json | 8 | 1 |
| clickAction.json | 2 | 1 |
| disappearAction.json | 4 | 2 |
| dropAction.json | 5 | 2 |
| Forceheffect.json | 5 | 1 |
| ghostdropAction.json | 6 | 2 |
| ghosteffects.json | 4 | 3 |
| ghosetffectscom1_1.json | 2 | 3 |
| ghosetffectscom1_2.json | 3 | 3 |
| ghosetffectscom2_1.json | 3 | 3 |
| ghosetffectscom2_2.json | 4 | 3 |
| Ghostelemwnt.json | 3 | 3 |
| glassclickAction.json | 2 | 2 |
| glassdropAction.json | 2 | 2 |
| noseclickAction.json | 4 | 3 |
| nosedropAction.json | 5 | 3 |
| windeffectAction.json | 10 | 3 |
| Boomeffects.json | 7 | 2 |
| Lasepang.json | 9 | 1 |
| Rewardeffects.json | 12 | 1 |

FIG. 4

| Closing stage | Total score | Animation script name |
|---|---|---|
| First stage | 30 | windeffectAction.json |
| | 15 | nosedropAction.json |
| | 14 | Boomeffects.json |
| | 12 | Rewardeffects.json |
| | 12 | noseclickAction.json |
| | 12 | ghostdropAction.json |
| | 12 | ghosteffects.json |
| | 12 | ghosetffectscom2_2.json |
| Second stage | 10 | dropAction.json |
| | 9 | Ghostelemwnt.json |
| | 9 | ghosetffectscom1_2.json |
| | 9 | ghosetffectscom2_1.json |
| | 9 | Lasepang.json |
| | 8 | boomAction.json |
| | 8 | disappearAction.json |
| | 6 | ghosetffectscom1_1.json |
| Third stage | 5 | Forceheffect.json |
| | 4 | glassclickAction.json |
| | 4 | glassdropAction.json |
| | 2 | clickAction.json |

FIG. 5

SELECTIVELY TURNING OFF ANIMATION FEATURES TO ADDRESS FRAME RATE INADEQUACY

CROSS-REFERENCE TO RELATED APPLICATIONS

The application is a continuation of U.S. Ser. No. 17/159,285 filed on Jan. 27, 2021, which is a continuation of and claims the benefit of priority under 35 U.S.C. § 120 from U.S. application Ser. No. 16/541,991 filed Aug. 15, 2019 now U.S. Pat. No. 10,970,908, which is a continuation of International Application No. PCT/CN2018/096268 filed Jul. 19, 2018, and claims the benefit of priority under 35 U.S.C. § 119 from China Patent Application No. 201710588981.X filed Jul. 19, 2017, the entire contents of each of which are incorporated herein by reference.

FIELD OF THE TECHNOLOGY

This application relates to the field of computer technologies, and in particular, to a display control method and apparatus for a game screen, an electronic device, and a computer readable storage medium.

BACKGROUND OF THE DISCLOSURE

With the rapid development of network technologies, people have increasingly higher requirements on playing fluency (e.g., display smoothness of video/picture frames) of game screen animations in games. Playing fluency of game screen animations is closely related to a playing frame rate thereof. The playing frame rate refers to the quantity of animation image frames played per second. When the playing frame rate of the animations is close to an industry-standard playing frame rate of the animations, the animations can be played fluently.

The playing fluency of the game screen animations is closely related to central processing unit (CPU) usage and memory usage during playing of the animations. When the CPU usage and the memory usage are not high, the animations can be played fluently; otherwise, the animations cannot be played fluently. When the CPU usage or the memory usage is relatively high during playing of the animations, time spent on calling each frame of image is increased, resulting in stalling in animation display. In the related technology, memory usage and time spent on rendering are reduced by reducing image quality or animation details, so as to improve the fluency of game screen animations. Alternatively, by reducing the CPU usage, for example, dividing a large quantity of simultaneous object creating operations into multiple frames to be performed gradually, and replacing a single-thread operation with a concurrent method, a CPU peak is prevented, so that a CPU usage curve becomes smooth, thereby improving the fluency of the game screen animation.

The foregoing optimization methods achieve certain effects in improving the fluency of game screen animations. However, such methods require a lot of later costs, and a lot of time needs to be spent on optimizing image quality, animation details, and object creating operations, to ensure the final fluency.

SUMMARY

To resolve the problem in the related technology that a lot of labor costs are required to improve the fluency of game screen animations, this application provides a display control method and apparatus for a game screen, an electronic device, and a storage medium.

For example, a terminal device for playing a game includes a display screen for displaying animation of the game, and processing circuitry. The processing circuitry detects a frame rate inadequacy of animation frames that are generated according to animation features respectively associated with animation files. Then, the processing circuitry obtains preconfigured values respectively associated with the animation files. A preconfigured value associated with an animation file is indicative of performance influence for turning off an animation feature associated with the animation file. Further, the processing circuitry turns off one or more animation features according to the preconfigured values associated with the animation files until an adequate frame rate is achieved.

In some embodiments, the preconfigured value associated with the animation file is a measure of at least one of graphic processing consumption and user experience of the animation feature. In an example, the preconfigured value associated with the animation file is a combination of a number of draw call commands to a graphics processing unit (GPU) for the animation feature and a user experience influence value for the animation feature.

In some embodiments, the processing circuitry determines an average frame rate of the animation frames that are generated according to animation features respectively associated with animation files and displayed on the display screen, and detects the frame rate inadequacy when the average frame rate is less than a preset frame rate.

In some embodiments, the processing circuitry classifies the animation features into multiple classes according to the preconfigured values, and turns off the animation features class by class until the adequate frame rate is achieved.

In some embodiments, the processing circuitry sorts the animation features into a turn-off sequence according to the preconfigured values, and turns off the animation features, for example one by one, according to the turn-off sequence until the adequate frame rate is achieved.

In some embodiments, the processing circuitry disables a loading of an animation file to a central processing unit (CPU) when an animation feature associated with the animation file is turned off.

The technical solutions provided in the embodiments of this application can include the following beneficial effects:

In this application, loading of a plurality of animation files is stopped according to an animation effect closability evaluation value (e.g., a measure of performance influence for turning off an animation feature) of each animation file, until fluency of game screen display is adjusted to a specified value. In this solution, it is unnecessary to spend much time on optimizing image quality, animation details, and object creating operations, thereby reducing the labor costs and improving the fluency of game screen display. Compared with the related technology, the solution of this application is also applicable to low-end models, and can improve display fluency of the low-end models. In addition, for devices with small memory, when the fluency cannot be further improved by releasing cache, memory usage can be further reduced by stopping loading of a plurality of animation files according to the solution of this application, thereby improving the display fluency.

It is appreciated that, the general description above and the following detailed description are merely examples, and cannot limit this application.

BRIEF DESCRIPTION OF THE DRAWINGS

The accompanying drawings herein, which are incorporated into the specification and form a part of the specification, show embodiments complying with this application, and are used for illustrating the principle of this application together with the specification.

FIG. 4 is a schematic diagram of a characteristic parameter list of each animation file according to an exemplary embodiment;

FIG. 5 is a schematic diagram of sorting of animation effect closability evaluation values of each animation file according to an exemplary embodiment;

DESCRIPTION OF EMBODIMENTS

Exemplary embodiments are described in detail herein, examples of which are illustrated in the accompanying drawings. When the following description relates to the accompanying drawings, the same numbers in different drawings represent the same or similar elements unless otherwise represented. The implementations described in the following exemplary embodiments do not represent all implementations consistent with this application. Instead, they are merely examples of apparatuses and methods consistent with some aspects of this application as recited in the appended claims.

Figure 1:
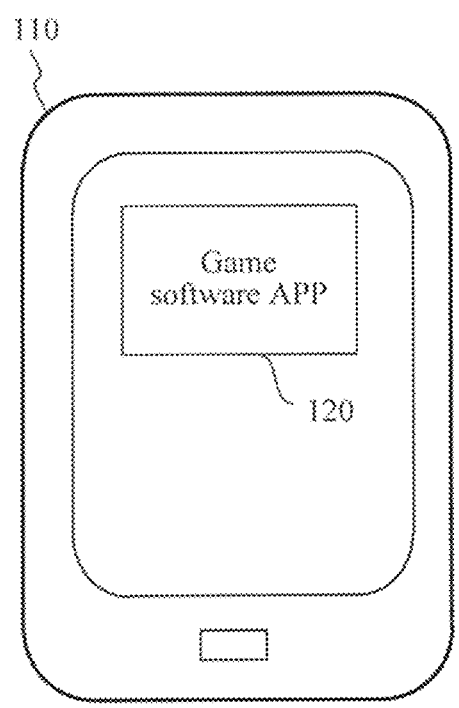
FIG. 1 is a schematic diagram of an implementation environment related to this application.

FIG. 1 is a schematic diagram of an implementation environment related to this application. The implementation environment includes: a mobile terminal 110 and at least one game software APP 120. The game software APP 120 is installed in the mobile terminal 110, and a game screen can be displayed after the mobile terminal 110 runs the game software APP 120. A display control program of the game screen is configured in the game software APP 120. In a running process of the game software APP 120, the mobile terminal 110 can control display of the game screen by calling the display control program of the game screen, so as to improve fluency of the game screen display and avoid game stalling.

Figure 2:
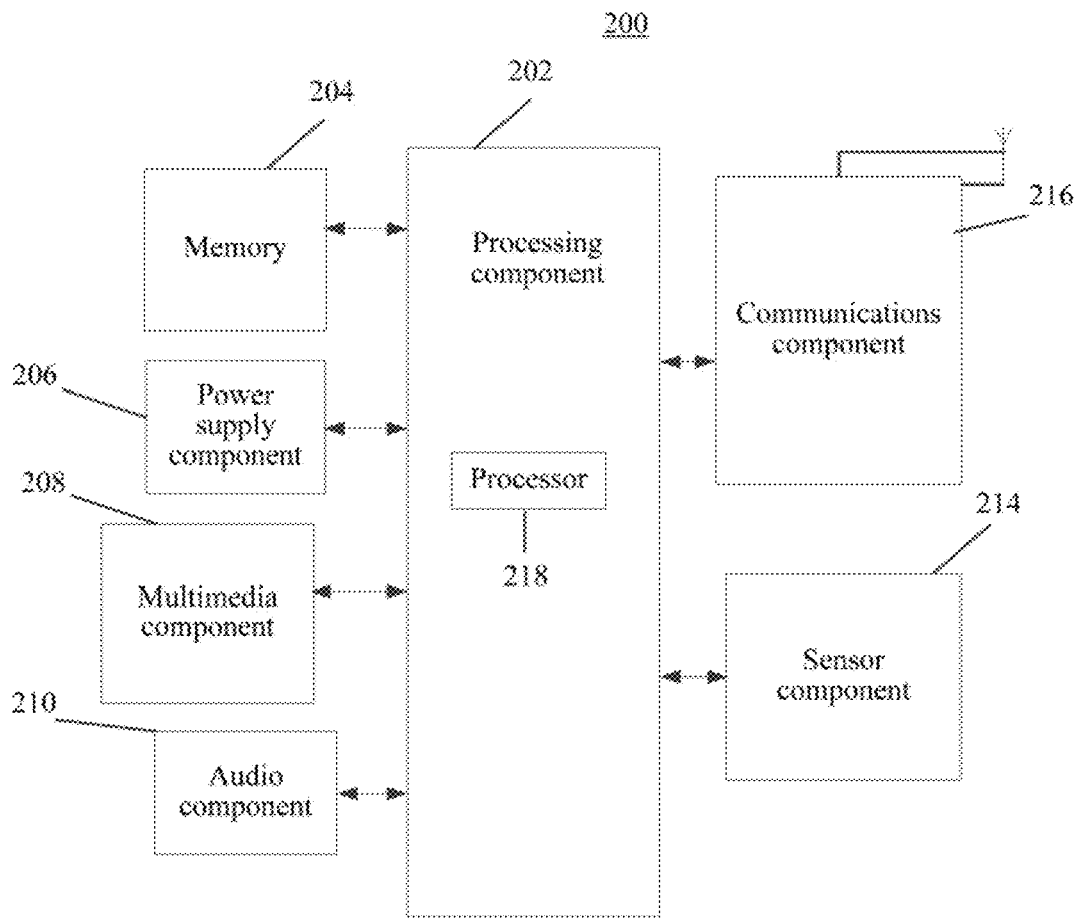
FIG. 2 is a block diagram of an apparatus according to an exemplary embodiment.

FIG. 2 is a block diagram of an apparatus 200 according to an exemplary embodiment. For example, the apparatus 200 may be a mobile terminal in the implementation environment shown in FIG. 1. The mobile terminal may be a smartphone, a tablet computer, and the like.

Referring to FIG. 2, the apparatus 200 may include one or more of the following components: a processing component 202, a memory 204, a power supply component 206, a multimedia component 208, an audio component 210, a sensor component 214, and a communications component 216.

The processing component 202 generally controls overall operations of the apparatus 200, for example, operations associated with display, a call, data communication, a camera operation, and a recording operation. The processing component 202 may include one or more processors 218 to execute instructions, to complete all or some of steps of the following method. In addition, the processing component 202 may include one or more modules, to facilitate interaction between the processing component 202 and other components. For example, the processing component 202 may include a multimedia module, to facilitate interaction between the multimedia component 208 and the processing component 202.

The memory 204 is configured to store various types of data to support operations on the apparatus 200. Examples of data include instructions of any application program or method operated on the apparatus 200. The memory 204 may be implemented by any type of volatile or non-volatile storage devices, or a combination thereof, for example, a static random access memory (SRAM), an electrically erasable programmable read-only memory (EEPROM), an erasable programmable read-only memory (EPROM), a programmable red-only memory (PROM), a read-only memory (ROM), a magnetic memory, a flash memory, a magnetic disk, or an optical disc. The memory 204 further stores one or more modules. The one or more modules are configured to be executed by the one or more processors 218, to complete all or some of steps of the method shown in any of FIG. 3 and FIG. 6 to FIG. 8.

The power supply component 206 supplies power to various components of the apparatus 200. The power supply component 206 may include a power supply management system, one or more power supplies, and other components associated with power generating, management, and distribution for the apparatus 200.

The multimedia component 208 includes a screen that provides an output interface between the apparatus 200 and a user. In some embodiments, the screen may include a liquid crystal display (LCD) and a touch panel. If the screen includes a touch panel, the screen may be implemented as a touchscreen, to receive input signals from the user. The touch panel includes one or more touch sensors to sense touch, sliding, and gestures on the touch panel. The touch sensor can not only sense the boundary of a touch or sliding action, but also detect duration and a pressure related to the touch or sliding operation. The screen may further include an organic light emitting display (OLED).

The audio component 210 is configured to input and/or output an audio signal. For example, the audio component 210 includes a microphone (MIC). When the apparatus 200 is in an operation mode, such as a call mode, a recording mode, or a speech recognition mode, the MIC is configured to receive an external audio signal. The received audio signal may be further stored in the memory 204 or sent through the communications component 216. In some embodiments, the audio component 210 further includes a loudspeaker configured to output an audio signal.

The sensor component 214 includes one or more sensors, configured to provide status evaluation of various aspects for the apparatus 200. For example, the sensor component 214 may detect an on/off state of the apparatus 200, and relative positions of components. The sensor component 214 may further detect a position change of the apparatus 200 or a component of the apparatus 200, and a temperature change of the apparatus 200. In some embodiments, the sensor component 214 may further include a magnetic sensor, a pressure sensor, or a temperature sensor.

The communications component 216 is configured to facilitate wired or wireless communication between the apparatus 200 and other devices. The apparatus 200 may be connected to a wireless network based on a communications standard, for example, Wireless-Fidelity (WiFi). In an exemplary embodiment, the communications component 216 receives a broadcast signal or broadcast-related information from an external broadcast management system through a broadcast channel. In an exemplary embodiment, the communications component 216 further includes a Near Field Communication (NFC) module, to facilitate short range communication. For example, the NFC module may be implemented based on a radio frequency identification (RFID) technology, an Infrared Data Association (IrDA) technology, an ultra wideband (UWB) technology, a Bluetooth technology, and other technologies.

In an exemplary embodiment, the apparatus 200 may be implemented by one or more application specific integrated circuits (ASICs), a digital signal processor, a digital signal processing device, a programmable logic device, a field programmable gate array, a controller, a micro-controller, a microprocessor, or other electronic elements, and is configured to perform the following method.

Figure 3:
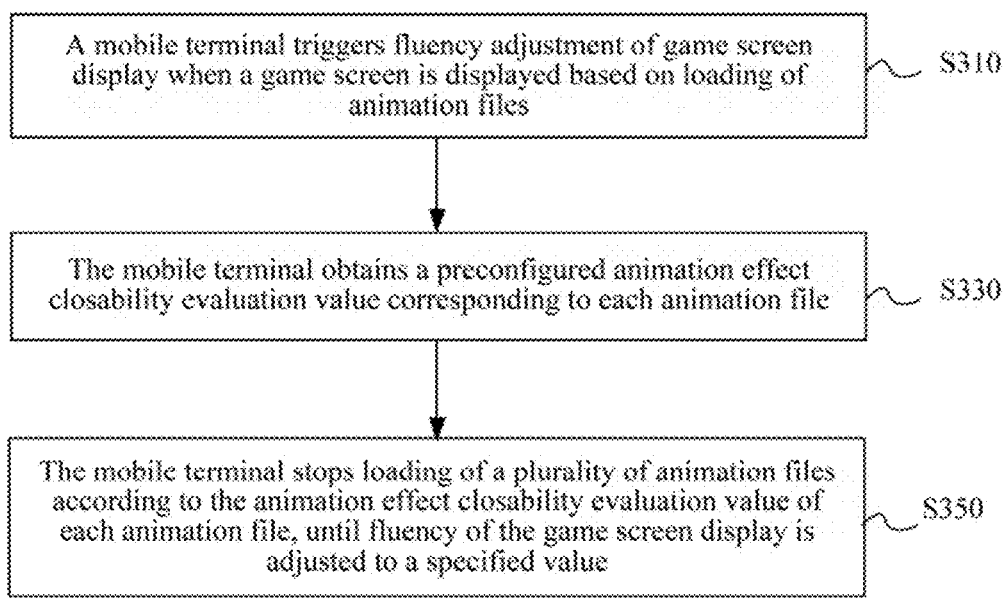
FIG. 3 is a flowchart of a display control method for a game screen according to an exemplary embodiment.

FIG. 3 is a flowchart of a display control method for a game screen according to an exemplary embodiment. An application scope and an execution entity of the display control method for a game screen may be as follows: for example, the method is applied to the mobile terminal 110 in the implementation environment shown in FIG. 1. The display control method for a game screen may be performed by the mobile terminal 110 by calling the stored game software APP 120. The method may include the following steps:

In step S310, a mobile terminal triggers fluency adjustment of game screen display when a game screen is displayed based on loading of animation files.

It is noted that, in a process of displaying the game screen, the game software APP of the mobile terminal may load many animation files, and then run according to programs written in the animation files. In the game screen display process, if it is detected that an animation stalls or a frame rate cannot reach a set value, fluency adjustment of the game screen display is triggered.

The quantity of frames that can be displayed per second during running of the game is referred to as a frame rate (which is expressed in Frames Per Second, or FPS for short). A greater FPS value indicates a smoother animation effect on the screen. Generally, a game with a stable frame rate of approximately 30 FPS can be considered as fluent or smooth. For example, a set value of the frame rate may be 20 frames per second, and when the frame rate cannot reach 20 frames per second, fluency adjustment is triggered.

In step S330, the mobile terminal obtains a preconfigured animation effect closability evaluation value corresponding to each animation file. The animation effect closability evaluation value of each animation file is determined according to a characteristic parameter of each animation file, and each animation file is used for implementing a corresponding animation effect in the game screen. In some examples, animation effect closability evaluation value is a measure of performance influence for turning off an animation feature associated with the animation file. The performance influence can be consumption of graphic processing capability (e.g., a number of call commands to graphic process unit) for the animation feature and can be user experience of the animation feature.

It is noted that, one animation effect is generated corresponding to running of one animation file. Running of a large quantity of animation files causes high CPU usage, thus resulting in game stalling. To improve the fluency of the game, some animation effects may be closed appropriately. In other words, loading of some animation files is stopped, so that the fluency of the game can be improved without affecting user experience.

Based on this, the mobile terminal may evaluate the animation effect of each animation file in advance, obtain the animation effect closability evaluation value of each animation file according to the characteristic parameter of each animation file, and pre-configure the animation effect closability evaluation value corresponding to each animation file onto the mobile terminal that is configured to load the animation files for displaying. For example, the animation effect closability evaluation value of each animation file may be obtained according to time or performance consumed for loading of each animation file. For example, the animation effect closability evaluation value of each animation file may be obtained according to a degree of influence of each animation effect on the user.

Optionally, the characteristic parameter of each animation file in step S330 may include a performance consumption parameter and or a display effect influence parameter of each animation file.

It is noted that, because the frame animations and particle effects related to images require particular processing during display of game animations, the key factor that affects the display fluency of the game animations is the performance of processing image resources. Except for program code logic, a rendering processing method for image resources is the biggest factor that affects the fluency, and in many cases, game stalling is caused by rendering processing for image resources by the CPU.

Therefore, the performance consumption parameter may be rendering times corresponding to each animation file. The rendering times refer to the number of times that a function (e.g., when a CPU executes the animation file to perform the animation feature) causes a graphics processing unit (GPU) to render a mesh in each frame of the game. For example, a mobile terminal includes a CPU and a GPU. When an animation file is loaded into the CPU, the CPU executes the animation file and provides command calls to the GPU to implement an animal feature associated with the animation file. For each frame of the game, the CPU gives the rendering times of commands to the GPU to render a mesh. Thus, the number of rendering times of commands to the GPU is used to measure the graphic processing consumption of the GPU for the animation feature associated with the animation file. Fewer calling times indicate higher efficiency of batch rendering, and this value is an important index determining the fluency of the game. Animation files with more rendering times have higher time and performance consumption, and loading of such animation files may be stopped first. To improve the fluency while minimizing influence on user experience, user experience may also be taken into consideration, and animation effects with high performance consumption and small influence on the user may be closed first.

To make it easy to obtain the corresponding animation effect closability evaluation value according to the characteristic parameter of each animation file, the mobile terminal may make a list of performance-consuming animation effects in accordance with rendering times, and then make a list for each animation effect in accordance with influence of the display effect on the user. A display effect influence value may be greater when the influence on the user is smaller (for example, the value ranges from 1 to 3). The obtained characteristic parameter of each animation file may be as shown in FIG. 4. Each animation script represents one animation file, and generates one animation effect. The animation effect closability evaluation value of each animation file=rendering times×influence value, thereby obtaining the animation effect closability evaluation value of each animation file, that is, the total score shown in FIG. 5.

In step S350, the mobile terminal stops loading of a plurality of animation files according to the animation effect closability evaluation value of each animation file, until fluency of the game screen display is adjusted to a specified value.

It is noted that, it is possible to stop, according to the animation effect closability evaluation values, loading of some animation files currently being loaded, to reduce the influence on the fluency of the game screen display, until the fluency of the game screen display is adjusted to the specified value, but this step is not limited thereto. The specified value may be used for, but not limited to, indicating a frame rate at which the game screen meets a fluent display requirement.

After obtaining the animation effect closability evaluation value of each animation file shown in FIG. 5, the mobile terminal may first stop loading of a plurality of animation files with greater evaluation values according to the animation effect closability evaluation value of each animation file, that is, close effects with higher performance consumption and smaller influence on user experience. Then, other animation effects are closed as required, until the fluency of the game screen is adjusted to the specified value (for example, the frame rate reaches 20 frames per second). In this application, instead of directly closing all animation effects to improve the fluency of the game screen display, a plurality of animation effects is closed, and operations of closing other animation effects can be stopped when the fluency meets the requirement, so that good fluency and good user experience are both achieved.

It is assumed that the mobile terminal 110 in the application scenario shown in FIG. 1 is a smartphone. There are many methods for improving the fluency of the game software APP run in the smartphone in the related technology, which mainly include reducing memory usage and time spent on rendering by reducing image quality and animation details, or dividing a large quantity of simultaneous object creating operations into multiple frames to be performed gradually, and replacing a single-thread operation with a concurrent method, so as to prevent a CPU peak and make a CPU usage curve smooth. These optimization methods achieve certain effects. However, such methods require a lot of later costs, and a lot of time needs to be spent on optimizing image quality, animation details, and object creating operations, to ensure the final fluency.

In addition, these optimizations are merely designed for the current mainstream models, and optimizations such as reducing the image quality are merely used for meeting the fluency requirement of the current mainstream models, but cannot be applied to low-end models. In other words, because the low-end models have low-level configurations and require lower image quality, the foregoing optimized image quality still fails to meet the fluency requirement of the low-end models.

To reduce the memory usage and improve the fluency of the smartphone game, the related technology further includes the following method: Animations and textures (when an image is loaded into the memory, the image exists in a form of textures; the textures are a block of continuous memory, and image pixel information filled according to a specified pixel format is stored in the block of memory) occupy most of the memory of the smartphone, to reduce the memory usage and improve the fluency of the game screen display, an effective method for maintaining memory stability is to release and recover the animations and textures in time.

For example, in a game developed in a Cocos2d-js engine, CCTextureCache (texture cache) is a bottom texture cache, and all directly loaded images are put into this cache by default, to improve calling efficiency. After it is confirmed that an image texture will not be again, the image texture may be released from the cache. In addition, a loading speed can also be increased by combining a large quantity of small images into a large image for loading. Sequential playing of animations in the cache can also reduce the time consumed in each animation creation.

The foregoing methods achieve the effect of improving the fluency of the game screen display theoretically. However, in the related technology, an android device has small memory, and after startup, there is little remaining memory, which is only dozens of megabytes. Small games can be run fluently, but there is severe stalling in running of large games. A large game occupies a lot of memory, and idle memory will be used up the moment when animation files of the game are loaded, and the fluency of the game cannot be further improved even by releasing cache to reduce memory usage.

Compared with the foregoing related technology, loading of a plurality of animation files is stopped according to an animation effect closability evaluation value of each animation file, until fluency of game screen display is adjusted to a specified value. In this solution, it is unnecessary to spend much time on optimizing image quality, animation details, and object creating operations, thereby reducing the labor costs and improving the fluency of game screen display. Moreover, the solution of this application is also applicable to low-end models, and can improve display fluency of the low-end models. In addition, for devices with small memory, when the fluency cannot be further improved by releasing cache, memory usage can be further reduced by stopping loading of a plurality of animation files according to the solution of this application, thereby improving the display fluency.

Figure 6:
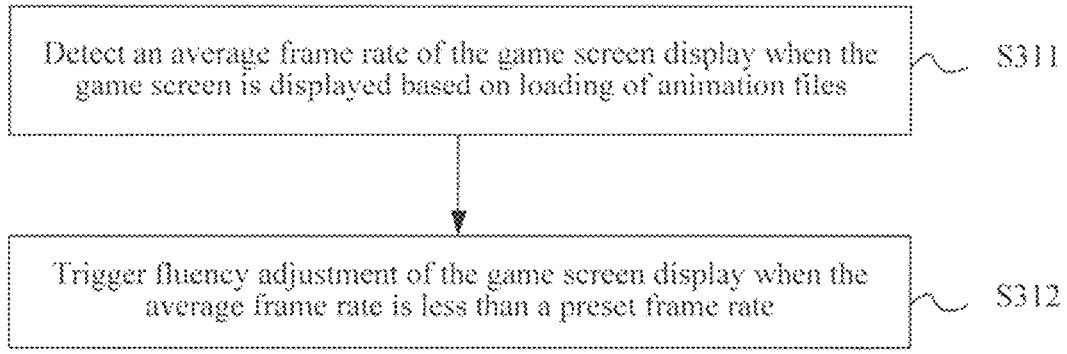
FIG. 6 is a schematic flowchart of description about details of step S310 in an embodiment corresponding to FIG. 3 according to an exemplary embodiment.

FIG. 6 is a schematic flowchart of description about details of step S310 in an embodiment corresponding to FIG. 3. As shown in FIG. 6, step S310 specifically includes the following steps:

In step S311, the mobile terminal detects an average frame rate of the game screen display when the game screen is displayed based on loading of animation files.

A timer function may be started in the game screen display process, to record an average frame rate in a fixed time interval (for example, 5 to 10 seconds). In addition, another timer may further be started to record a time interval of each frame. A frame rate is obtained by calculating the quantity of frames per second. Finally, frame rates in the fixed time interval are averaged to obtain an average frame rate.

In step S312, fluency adjustment of the game screen display is triggered when the average frame rate is less than a preset frame rate.

The fixed time interval being 10 seconds is used as an example for description. The mobile terminal may trigger calling of an onTimerOver function every 10 seconds, to determine whether an average frame rate in the past 10 seconds is less than a specific value (for example, 20 frames per second). If the average frame rate is less than the specific value, logic for adjusting the fluency of the game screen display is triggered. If the average frame rate is still less than 20 frames per second after a plurality of animation effects is closed, the mobile terminal continues to close other animation effects, until the average frame rate is greater than 20 frames per second.

Figure 7:
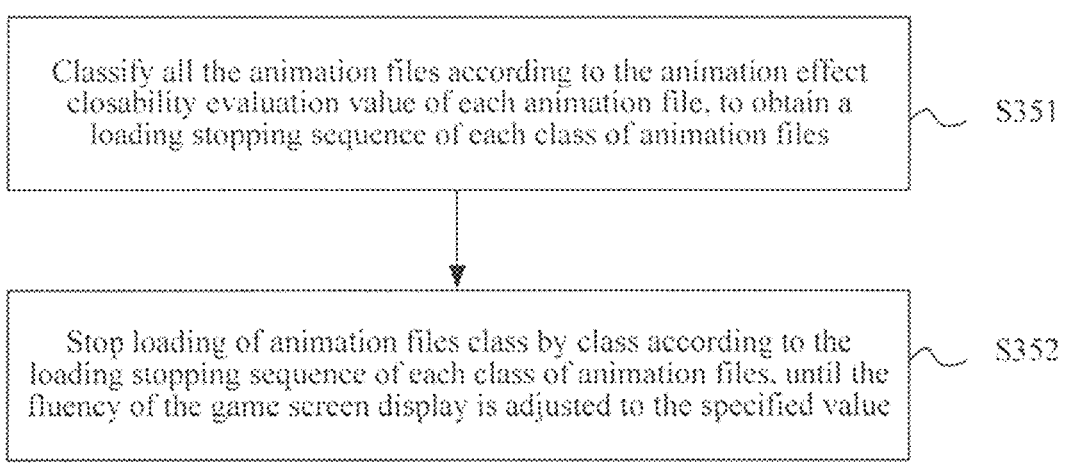
FIG. 7 is a schematic flowchart of description about details of step S350 in an embodiment corresponding to FIG. 3 according to an exemplary embodiment.

FIG. 7 is a schematic flowchart of description about details of step S350 in an embodiment corresponding to FIG. 3. As shown in FIG. 7, step S350 may specifically include the following steps:

In step S351, the mobile terminal classifies all the animation files according to the animation effect closability evaluation value of each animation file, to obtain a loading stopping sequence of each class of animation files.

After obtaining the animation effect closability evaluation value of each animation file in S330, the mobile terminal may classify all the animation files according to the magnitudes of the animation effect closability evaluation values. As shown in FIG. 5, animation files whose animation effect closability evaluation values are greater than or equal to 10 are classified into a first class, animation files whose animation effect closability evaluation values are less than 10 and greater than or equal to 5 are classified into a second class, and animation files whose animation effect closability evaluation values are less than 5 are classified into a third class.

As shown in FIG. 5 and FIG. 6, to preferentially close animation effects with high performance consumption and small influence on the user, the mobile terminal may preferentially close animation files with larger animation effect closability evaluation values. Therefore, loading of the first class of animation files is stopped first, followed by the second class, and finally the third class.

In step S355, the mobile terminal stops loading of animation files class by class according to the loading stopping sequence of each class of animation files, until the fluency of the game screen display is adjusted to the specified value.

After the fluency adjustment is triggered, according to the foregoing loading stopping sequence of each class of animation files, loading of the first class of animation files whose evaluation values are greater than or equal to 10 is first stopped in the first stage. If the later fluency reaches the specified value (for example, if the frame rate is greater than or equal to 20 frames per second), other animation effects may not be closed. If the later frame rate is still less than 20 frames per second, loading of the class of animation files whose evaluation values are greater than or equal to 5 is stopped in the second stage. If the later frame rate is still less than 20 frames per second, loading of the class of animation files whose evaluation values are less than or equal to 5 is stopped, until the fluency of the game screen display is adjusted to the specified value.

Figure 8:
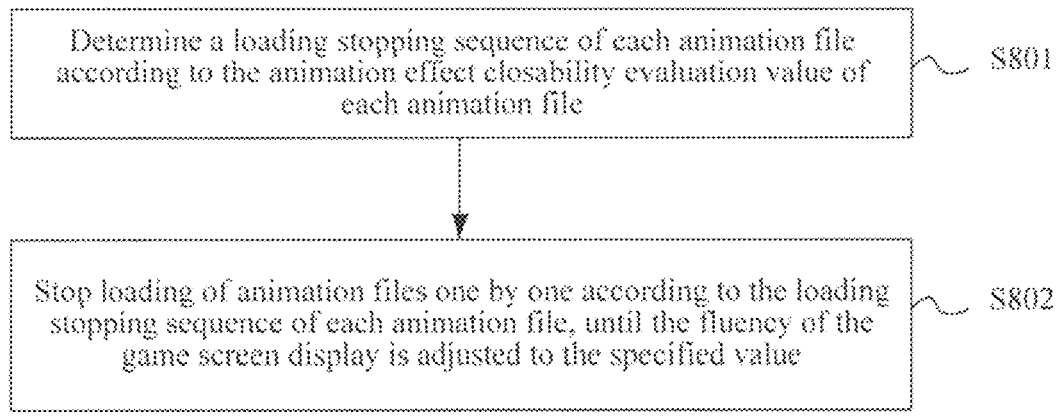
FIG. 8 is a schematic flowchart of description about details of step S350 in an embodiment corresponding to FIG. 3 according to another exemplary embodiment.

In another implementation, as shown in FIG. 8, step S350 in the embodiment corresponding to FIG. 3 may specifically include the following steps:

In step S801, the mobile terminal determines a loading stopping sequence of each animation file according to the animation effect closability evaluation value of each animation file.

It is noted that, the difference between the embodiment corresponding to FIG. 8 and the embodiment corresponding to FIG. 7 lies in that, loading of animation files is sequentially stopped class by class in the embodiment corresponding to FIG. 7, that is, multiple animation effects are closed each time, and the animation effects are sequentially closed in multiple times (multiple animation effects are closed each time); loading of animation files is sequentially stopped one by one in the embodiment corresponding to FIG. 8, that is, the mobile terminal closes one animation effect each time, and closes the animation effects sequentially.

After obtaining the animation effect closability evaluation value of each animation file, the mobile terminal may sort each animation file. As shown in FIG. 5, each animation file may be sorted in descending order of the animation effect closability evaluation values, to obtain the loading stopping sequence of each animation file.

In step S802, the mobile terminal stops loading of animation files one by one according to the loading stopping sequence of each animation file, until the fluency of the game screen display is adjusted to the specified value.

In this exemplary embodiment, loading of animation files may be sequentially stopped one by one according to the loading stopping sequence of each animation file. That is, the mobile terminal closes one animation effect each time, and closes animation effects one by one, until the fluency of the game screen display is adjusted to the specified value.

The following is an apparatus embodiment of this application, which can be used for performing the foregoing embodiment of the display control method for a game screen performed by the mobile terminal 110 of this application. For details not disclosed in the apparatus embodiment of this application, refer to the embodiment of the display control method for a game screen of this application.

Figure 9:
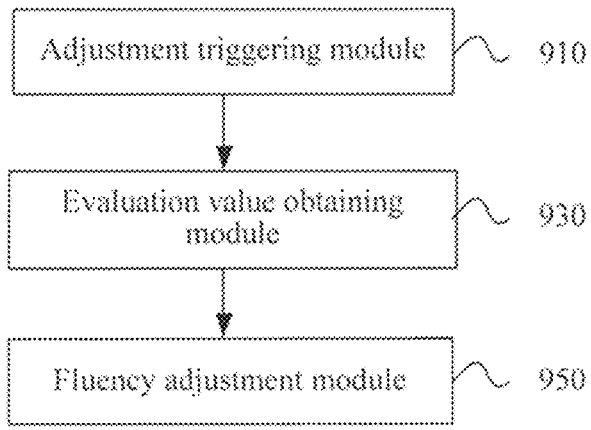
FIG. 9 is a block diagram of a display control apparatus for a game screen according to an exemplary embodiment.

FIG. 9 is a block diagram of a display control apparatus for a game screen according to an exemplary embodiment. The display control apparatus for a game screen may be applied to the mobile terminal 110 in the implementation environment shown in FIG. 1, and perform all or some of steps of the display control method for a game screen shown in any of FIG. 3 and FIG. 6 to FIG. 8. As shown in FIG. 9, the display control apparatus for a game screen may include, but is not limited to: an adjustment triggering module 910, an evaluation value obtaining module 930, and a fluency adjustment module 950.

The adjustment triggering module 910 is configured to trigger fluency adjustment of game screen display when a game screen is displayed based on loading of animation files.

The evaluation value obtaining module 930 is configured to obtain a preconfigured animation effect closability evaluation value corresponding to each animation file, the animation effect closability evaluation value of each animation file being determined according to a characteristic parameter of each animation file, and each animation file being used for implementing a corresponding animation effect in the game screen.

The fluency adjustment module 950 is configured to stop loading of a plurality of animation files according to the animation effect closability evaluation value of each animation file, until fluency of the game screen display is adjusted to a specified value.

For specific implementation process of the function and effect of each module in the apparatus, refer to the implementation process of the corresponding step in the foregoing display control method for a game screen, details are not described herein again.

The adjustment triggering module 910 may be, for example, a physical-structure communications component 216 in FIG. 2.

The evaluation value obtaining module 930 and the fluency adjustment module 950 may also be functional modules configured to perform corresponding steps in the foregoing display control method for a game screen. It can be understood that, the modules may be implemented by hardware, software, or a combination hereof. When implemented by hardware, the modules may be implemented as one or more hardware modules, for example, one or more application-specific integrated circuits. When implemented by software, the modules may be implemented as one or more computer programs executed on one or more processors, for example, the program that is stored in the memory 204 and executed by the processor 218 in FIG. 2.

Optionally, the characteristic parameter of each animation file may include a performance consumption parameter and/or a display effect influence parameter of each animation file.

Figure 10:
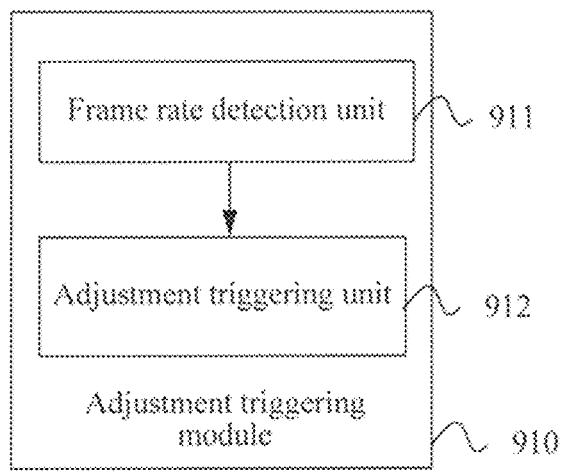
FIG. 10 is a detailed block diagram of an adjustment triggering module in an embodiment corresponding to FIG. 9.

FIG. 10 is a detailed block diagram of the adjustment triggering module 910 in the embodiment corresponding to FIG. 9. As shown in FIG. 10, the adjustment triggering module 910 may include, but is not limited to:

a frame rate detection unit 911, configured to detect an average frame rate of the game screen display when the game screen is displayed based on loading of animation files; and an adjustment triggering unit 912, configured to trigger fluency adjustment of the game screen display when the average frame rate is less than a preset frame rate.

Figure 11:
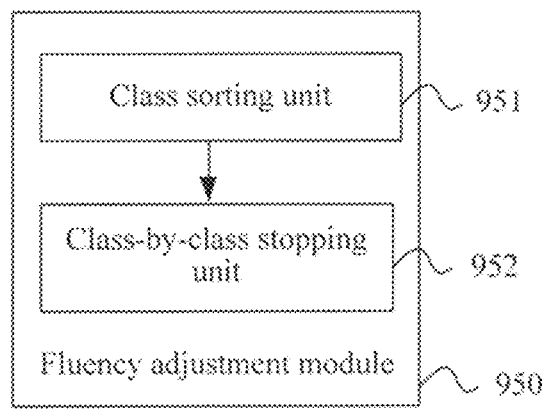
FIG. 11 is a detailed block diagram of a fluency adjustment module in an embodiment corresponding to FIG. 9 according to an exemplary embodiment.

In one embodiment, FIG. 11 is a detailed block diagram of the fluency adjustment module 950 in the embodiment corresponding to FIG. 9. As shown in FIG. 11, the fluency adjustment module 950 may include, but is not limited to:

a class sorting unit 951, configured to classify all the animation files according to the animation effect closability evaluation value of each animation file, to obtain a loading stopping sequence of each class of animation files; and a class-by-class stopping unit 952, configured to stop loading of animation files class by class according to the loading stopping sequence of each class of animation files, until the fluency of the game screen display is adjusted to the specified value.

Figure 12:
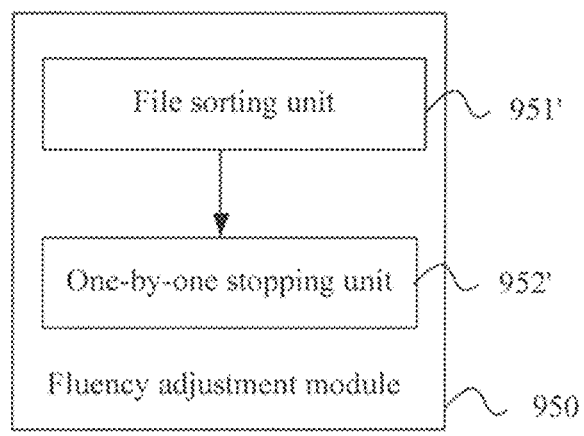
FIG. 12 is a detailed block diagram of a fluency adjustment module in an embodiment corresponding to FIG. 9 according to another exemplary embodiment.

In another embodiment, FIG. 12 is a detailed block diagram of the fluency adjustment module 950 in the embodiment corresponding to FIG. 9. As shown in FIG. 12, the fluency adjustment module 950 may include, but is not limited to:

a file sorting unit 951', configured to determine a loading stopping sequence of each animation file according to the animation effect closability evaluation value of each animation file; and a one-by-one stopping unit 952', configured to stop loading of animation files one by one according to the loading stopping sequence of each animation file, until the fluency of the game screen display is adjusted to the specified value.

Figure 13:
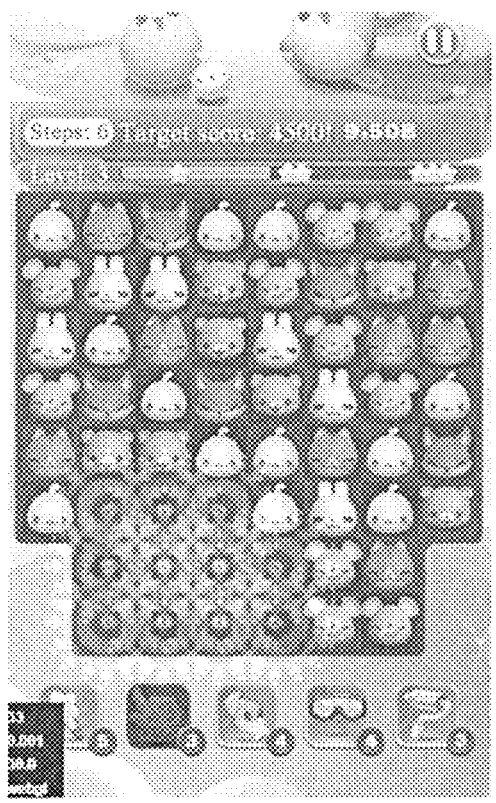
FIG. 13 is an interface diagram of an optional display interface in which an animation effect is not closed according to an embodiment of this application.
Figure 14:
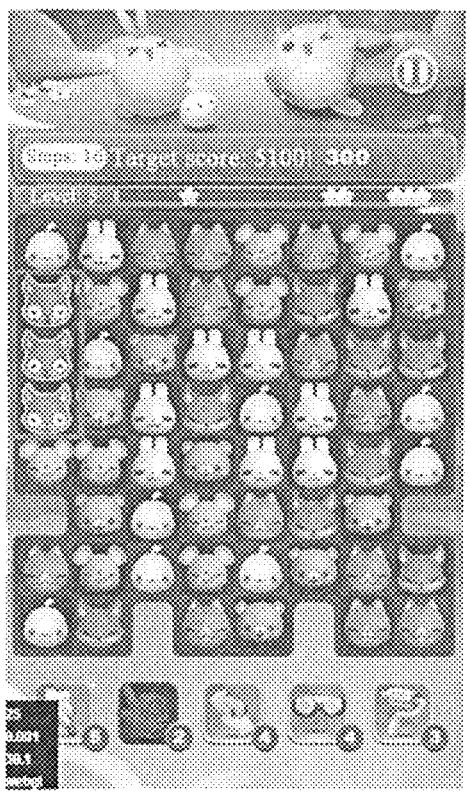
FIG. 14 is an interface diagram of an optional display interface in which an animation effect is closed according to an embodiment of this application.

By using the display control method and apparatus for game screen provided in this application, some of animation effects are closed to improve fluency of game screen display. In FIG. 13 and FIG. 14, a comparison is made between a display interface in which an animation effect is closed and a normal effect interface from the perspective of visual effects perceived by a user. FIG. 13 is an interface diagram of a display interface in which an animation effect is not closed, and FIG. 14 is an interface diagram of a display interface in which an animation effect is closed. It can be seen from FIG. 13 and FIG. 14 that, after the animation effect is closed, merely simple animation playing chess pieces disappear, and then the subsequent logic is continued.

Figure 15:
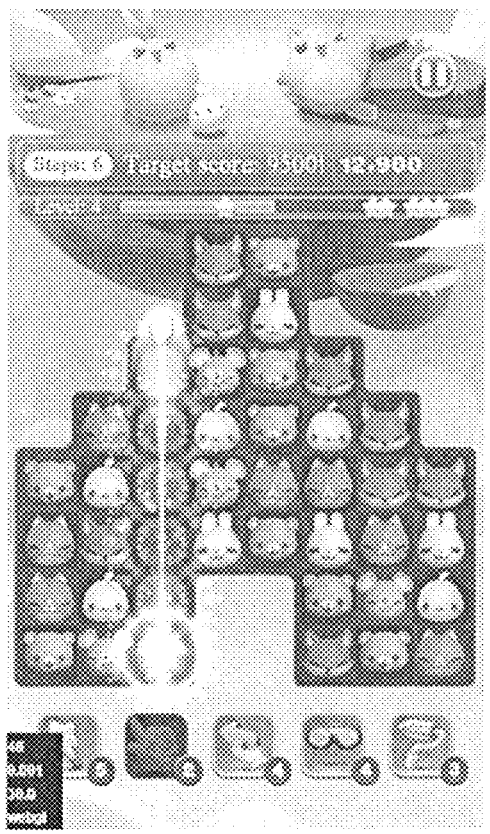
FIG. 15 is an interface diagram of an optional display interface in which a cross shock wave animation effect is not closed according to an embodiment of this application.
Figure 16:
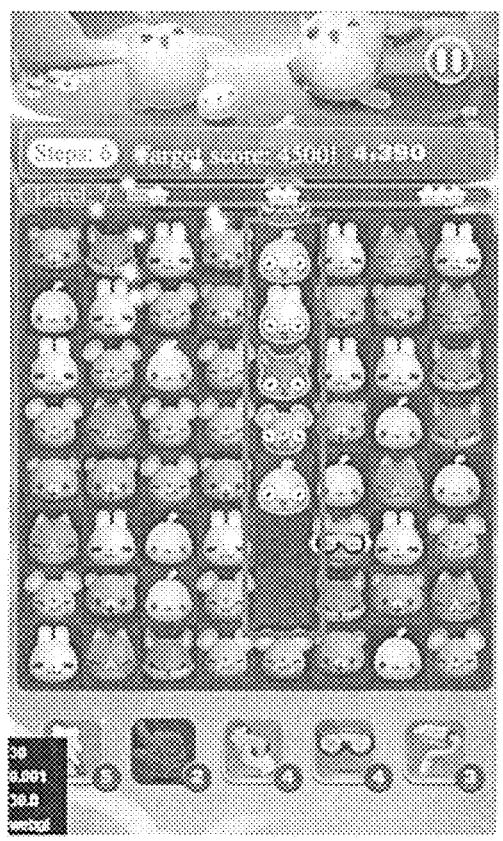
FIG. 16 is an interface diagram of an optional display interface in which a cross shock wave animation effect is closed according to an embodiment of this application.

In FIG. 15 and FIG. 16, a comparison is made between a display interface in which a cross shock wave animation effect is closed and a normal effect interface from the perspective of visual effects perceived by a user. FIG. 15 is an interface diagram of a display interface in which a cross shock wave animation effect is not closed, and FIG. 16 is an interface diagram of a display interface in which a cross shock wave animation effect is closed. It can be seen from FIG. 15 and FIG. 16 that, after the animation effect is closed, the chess pieces directly drop directly, and then the subsequent logic is continued.

After the foregoing processing of closing the animation effects, a frame rate on a low-end machine can also be stabilized at about 25 frames per second from the previous frame rate lower than 20 frames per second, and the overall running of the game is fluent.

Figure 17:
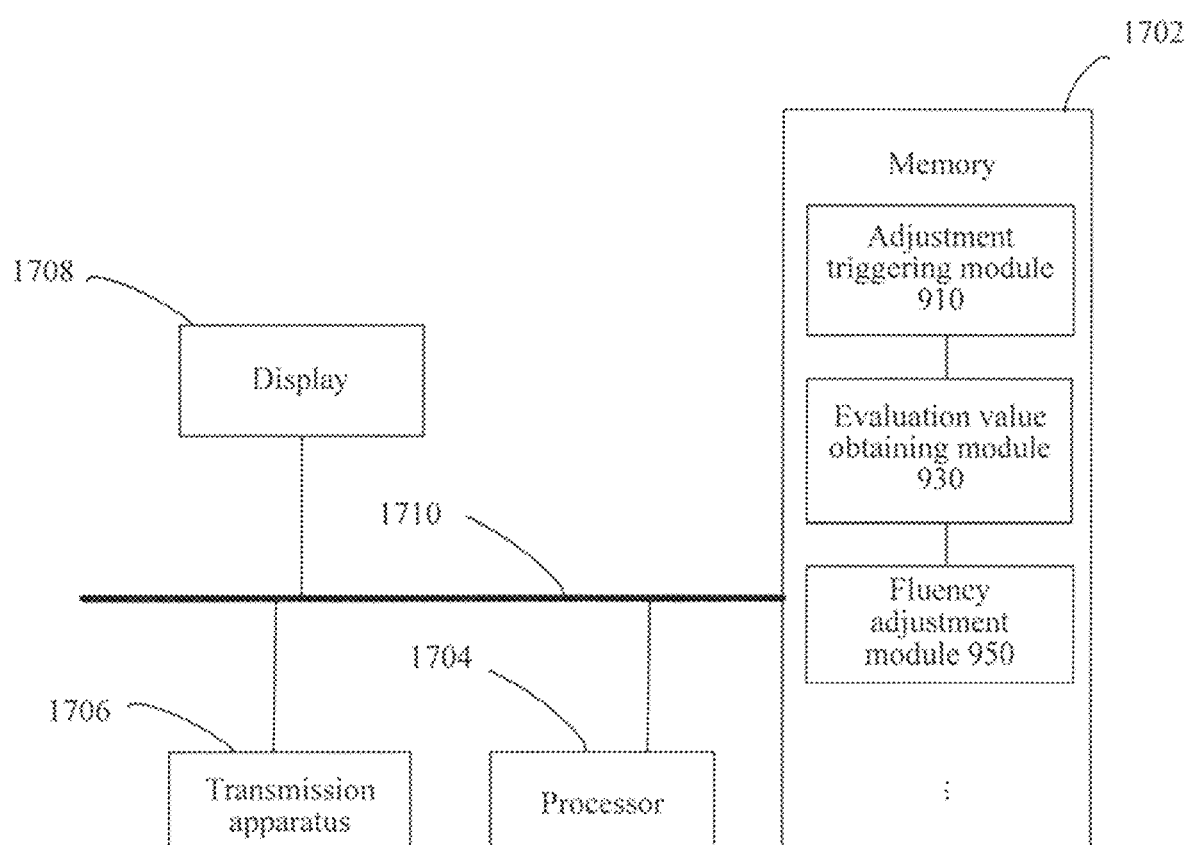
FIG. 17 is a structural block diagram of an optional electronic apparatus according to an embodiment of this application.

Optionally, this application further provides an electronic device. The electronic device may be applied to the mobile terminal 110 in the implementation environment shown in FIG. 1, and perform some or all of steps of the display control method for a game screen shown in any of FIG. 3 and FIG. 6 to FIG. 8. Optionally, in an optional embodiment, as shown in FIG. 17, the electronic device includes:

a processor 1704; and a memory 1702 configured to store a computer program;

the processor being configured to perform, through the computer program, the display control method for a game screen provided in the foregoing exemplary embodiment.

Optionally, in this embodiment, the electronic device may be located in at least one network device among multiple network devices in a computer network.

Optionally, in this embodiment, the processor may be configured to perform the following steps through the computer program:

S1, triggering fluency adjustment of game screen display when a game screen is displayed based on loading of animation files;

S2, obtaining a preconfigured animation effect closability evaluation value corresponding to each animation file, the animation effect closability evaluation value of each animation file being determined according to a characteristic parameter of each animation file, and each animation file being used for implementing a corresponding animation effect in the game screen; and S3, stopping loading of a plurality of animation files according to the animation effect closability evaluation value of each animation file, until fluency of the game screen display is adjusted to a specified value.

Optionally, it may be appreciated by a person of ordinary skill in the art that, FIG. 17 merely shows a schematic structure. The electronic device may also be a terminal device such as a smartphone (such as an Android phone or an iOS phone), a tablet computer, a palmtop computer, a mobile internet device (MID), or a PAD. FIG. 17 does not limit the structure of the electronic device. For example, the electronic device may also include more or fewer components (such as a network interface) than those shown in FIG. 17, or have a configuration different from that shown in FIG. 17.

The memory 1702 may be configured to store a software program and module, such as a program instruction/module corresponding to the display control method and apparatus for a game screen in the embodiments of the present disclosure. The processor 1704 executes different functional applications and performs data processing by running the software program and module stored in the memory 1702, thereby implementing the foregoing display control method for a game screen. The memory 1702 may include a high-speed random memory, and may also include a non-volatile memory, for example, one or more magnetic storage apparatuses, flash memories or other non-volatile solid-state memories. In some embodiments, the memory 1702 may further include memories 1702 remotely disposed relative to the processor 1704, and these remote memories may be connected to the terminal through a network. Examples of the network include, but are not limited to, the Internet, an intranet, a local area network, a mobile communications network, or a combination thereof. The memory 1702 specifically may be configured to store sample features of items, target virtual resource account, and other information, but the function of the memory 1702 is not limited thereto. In an example, as shown in FIG. 17, the memory 1702 may include, but is not limited to, the adjustment triggering module 910, the evaluation value obtaining module 930, and the fluency adjustment module 950 in the foregoing display control apparatus for a game screen. In addition, the memory 1702 may further include, but is not limited to, other modules or units in the foregoing display control apparatus for a game screen, which are not described again in this embodiment.

Optionally, the transmission apparatus 1706 is configured to receive or send data through a network. Specific examples of the network may include a wired network and a wireless network. In an embodiment, the transmission apparatus 1706 includes a network interface controller (NIC), which may be connected to other network devices and a router through a network, thereby communicating with the Internet or a local area network. In an embodiment, the transmission apparatus 1706 is a radio frequency (RF) module, which is configured to communicate with the Internet in a wireless manner.

In addition, the electronic device further includes: a display 1708, configured to display the foregoing game screen; and a connection bus 1710, configured to connect various module components in the electronic device.

In an exemplary embodiment, a storage medium is further provided. The storage medium is a computer readable storage medium, for example, a temporary or non-temporary computer readable storage medium including instructions. A computer program is stored in the storage medium. The computer program may be executed by the processor 218 of the apparatus 200 to complete the display control method for a game screen provided in the foregoing exemplary embodiment.

It is appreciated that, this application is not limited to the precise structure described above and shown in the accompanying drawings, and various modifications and changes can be made without departing from the scope of this application. The scope of this application is only subject to the appended claims.

In this disclosure, loading of a plurality of animation files is stopped according to an animation effect closability evaluation value of each animation file, until fluency of game screen display is adjusted to a specified value. Accordingly, it is unnecessary to spend much time on optimizing image quality, animation details, and object creating operations, thereby reducing the labor costs and improving the fluency of game screen display. Compared with the related technology, the disclosed methods can be applied to low-end models of devices, and can improve display fluency of the low-end models of devices. In addition, for devices with small memory, when the fluency cannot be further improved by releasing cache, memory usage can be further reduced by stopping loading of a plurality of animation files according to the present disclosure, thereby improving the display fluency.

What is claimed is:

1. A method for display control, comprising:
displaying, by processing circuitry of a terminal device, animation for game play on a display screen, with at least two animation features being turned on, wherein a first animation feature of the at least two animation features has a higher impact on frame rate than a second animation feature of the at least two animation features;
detecting, by the processing circuitry, a frame rate inadequacy of animation frames displayed on the display screen;
based on a determination that the first animation feature has the higher impact on the frame rate than the second animation feature, turning off, by the processing circuitry, the first animation feature;
after turning off the first animation feature, determining, by the processing circuitry, whether the frame rate inadequacy continues to exist; and
turning off, by the processing circuitry, the second animation feature in response to a determination that the frame rate inadequacy continues to exist.

2. The method according to claim 1, wherein
each of the at least two animation features is associated with a corresponding preconfigured value, and
each preconfigured value associated with a respective animation feature is a measure of at least one of graphic processing consumption or user experience of the respective animation feature.

3. The method according to claim 2, wherein
each preconfigured value associated with a respective animation feature is a combination of a number of draw call commands to a graphics processing unit (GPU) for the respective animation feature and a user experience influence value for the respective animation feature.

4. The method according to claim 2, wherein the determination that the first animation feature has the higher impact on the frame rate than the second animation feature is based on a comparison between a preconfigured value associated with the first animation feature and a preconfigured value associated with the second animation feature.

5. The method according to claim 2, further comprising:
prior to the displaying the animation, evaluating each of the at least two animation features and determining the corresponding preconfigured value, wherein
each corresponding preconfigured value indicates performance influence of turning off the respective animation feature.

6. The method according to claim 1, further comprising:
determining an average frame rate of the animation frames displayed on the display screen; and
detecting the frame rate inadequacy when the average frame rate is less than a preset frame rate.

7. The method according to claim 1, further comprising:
disabling a loading of an animation file to a central processing unit (CPU) when an animation feature associated with the animation file is turned off.

8. A terminal device, comprising:
a display screen; and
processing circuitry configured to
display, on the display screen, animation for game play, with at least two animation features being turned on, wherein a first animation feature of the at least two animation features has a higher impact on frame rate than a second animation feature of the at least two animation features;
detect a frame rate inadequacy of animation frames displayed on the display screen;
based on a determination that the first animation feature has the higher impact on the frame rate than the second animation feature, turn off the first animation feature;
after turning off the first animation feature, determine whether the frame rate inadequacy continues to exist; and
turn off the second animation feature in response to a determination that the frame rate inadequacy continues to exist.

9. The terminal device according to claim 8, wherein
each of the at least two animation features is associated with a corresponding preconfigured value, and
each preconfigured value associated with a respective animation feature is a measure of at least one of graphic processing consumption or user experience of the respective animation feature.

10. The terminal device according to claim 9, wherein
each preconfigured value associated with a respective animation feature is a combination of a number of draw call commands to a graphics processing unit (GPU) for the respective animation feature and a user experience influence value for the respective animation feature.

11. The terminal device according to claim 9, wherein the determination that the first animation feature has the higher impact on the frame rate than the second animation feature is based on a comparison between a preconfigured value associated with the first animation feature and a preconfigured value associated with the second animation feature.

12. The terminal device according to claim 9, wherein the processing circuitry is further configured to:
prior to displaying the animation, evaluate each of the at least two animation features and determine the corresponding preconfigured value, wherein
each corresponding preconfigured value indicates performance influence of turning off the respective animation feature.

13. The terminal device according to claim 8, wherein the processing circuitry is further configured to:
determine an average frame rate of the animation frames displayed on the display screen; and
detect the frame rate inadequacy when the average frame rate is less than a preset frame rate.

14. The terminal device according to claim 8, wherein the processing circuitry is further configured to:
disable a loading of an animation file to a central processing unit (CPU) when an animation feature associated with the animation file is turned off.

15. A non-transitory computer-readable storage medium storing computer-readable instructions thereon, which, when executed by processing circuitry of a terminal device, cause the terminal device to perform a method, comprising:
displaying animation for game play on a display screen, with at least two animation features being turned on, wherein a first animation feature of the at least two animation features has a higher impact on frame rate than a second animation feature of the at least two animation features;
detecting a frame rate inadequacy of animation frames displayed on the display screen;
based on a determination that the first animation feature has the higher impact on the frame rate than the second animation feature, turning off the first animation feature;
after turning off the first animation feature, determining whether the frame rate inadequacy continues to exist; and
turning off the second animation feature in response to a determination that the frame rate inadequacy continues to exist.

16. The non-transitory computer-readable storage medium according to claim 15, wherein
each of the at least two animation features is associated with a corresponding preconfigured value, and
each preconfigured value associated with a respective animation feature is a measure of at least one of graphic processing consumption or user experience of the respective animation feature.

17. The non-transitory computer-readable storage medium according to claim 16, wherein
each preconfigured value associated with a respective animation feature is a combination of a number of draw call commands to a graphics processing unit (GPU) for the respective animation feature and a user experience influence value for the respective animation feature.

18. The non-transitory computer-readable storage medium according to claim 16, wherein the determination that the first animation feature has the higher impact on the frame rate than the second animation feature is based on a comparison between a preconfigured value associated with the first animation feature and a preconfigured value associated with the second animation feature.

19. The non-transitory computer-readable storage medium according to claim 16, the method further comprising:
prior to the displaying the animation, evaluating each of the at least two animation features and determining the corresponding preconfigured value, wherein
each corresponding preconfigured value indicates performance influence of turning off the respective animation feature.

20. The non-transitory computer-readable storage medium according to claim 15, the method further comprising:

determining an average frame rate of the animation frames displayed on the display screen; and detecting the frame rate inadequacy when the average frame rate is less than a preset frame rate.

* * * * *